(12) United States Patent
Wintergerst

(10) Patent No.: US 11,148,842 B2
(45) Date of Patent: Oct. 19, 2021

(54) PACKAGING ASSEMBLY WITH UNDERGRIPPER

(71) Applicant: MULTIVAC SEPP HAGGENMUELLER SE & CO. KG, Wolfertschwenden (DE)

(72) Inventor: Bernd Wintergerst, Hawangen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 10 days.

(21) Appl. No.: 16/722,669

(22) Filed: Dec. 20, 2019

(65) Prior Publication Data
US 2020/0198818 A1    Jun. 25, 2020

(30) Foreign Application Priority Data
Dec. 20, 2018   (DE) .......................... 102018222397.1

(51) Int. Cl.
*B65B 35/24*    (2006.01)
*B65B 25/06*    (2006.01)
(Continued)

(52) U.S. Cl.
CPC .............. *B65B 35/24* (2013.01); *B65B 25/06* (2013.01); *B65G 21/20* (2013.01); *B65G 21/22* (2013.01); *B65G 47/57* (2013.01)

(58) Field of Classification Search
CPC ...... B65G 21/20; B65G 21/22; B65G 17/002; B65G 47/90; B65G 47/57; B65G 47/52; B65G 47/74; B65B 35/24; B65B 25/06; B65B 35/205; B65B 5/024; B65B 11/004; B25J 15/0014; B25J 15/00
(Continued)

(56) References Cited

U.S. PATENT DOCUMENTS 6,092,645 A  *  7/2000  Wahren ..................... B32B 7/02
                                                         198/847
10,384,886 B2    8/2019  Gerhardt et al.
(Continued)

FOREIGN PATENT DOCUMENTS

DE       602005001393 T2    3/2008
EP            1698557 B1    6/2007
(Continued)

OTHER PUBLICATIONS

European Search Report dated Apr. 15, 2020, Application No. 19215105.8-1016, Applicant Multivac Sepp Haggenmueller SE & Co. KG, 6 Pages.
(Continued)

*Primary Examiner* — James R Bidwell
(74) *Attorney, Agent, or Firm* — Brooks Kushman P.C.

(57) ABSTRACT

A packaging assembly comprising a feed conveyor, a gripping area and an undergripper, wherein the feed conveyor has a conveying surface and is suitable for conveying on the conveying surface a product support into the gripping area. The undergripper is configured to grip the product support in the gripping area from below. The packaging assembly has, in the gripping area, a support strip for the product support with an inner edge and an upper surface, the upper surface being raised in comparison with the conveying surface of the feed conveyor.

16 Claims, 4 Drawing Sheets

(51) Int. Cl.
*B65G 21/20* (2006.01)
*B65G 21/22* (2006.01)
*B65G 47/57* (2006.01)

(58) Field of Classification Search
USPC .............................. 198/836.1, 836.3, 867.13
See application file for complete search history.

(56) References Cited

U.S. PATENT DOCUMENTS

| | | |
|---|---|---|
| 2012/0055760 A1 | 3/2012 | Viglundsson et al. |
| 2012/0161459 A1* | 6/2012 | Weber .................. B25J 15/0266 |
| | | 294/106 |
| 2016/0176561 A1* | 6/2016 | Findlay ................ B25J 15/0014 |
| | | 53/438 |
| 2017/0225911 A1* | 8/2017 | Baechle .................. B65B 35/24 |
| 2018/0079541 A1* | 3/2018 | Wintergerst ............ B65B 65/02 |

FOREIGN PATENT DOCUMENTS

| | | |
|---|---|---|
| EP | 3 241 761 A2 | 11/2017 |
| EP | 3 241 761 A3 | 1/2018 |
| GB | 2 174 064 A | 10/1986 |
| WO | 99/00306 A2 | 1/1999 |
| WO | 99/00306 A3 | 1/1999 |
| WO | 2016142231 A1 | 9/2016 |

OTHER PUBLICATIONS

German Search Report dated Nov. 18, 2019, Application No. 102018222397.1, Applicant Multivac Sepp Haggenmueller SE & Co. KG, 7 Pages.

\* cited by examiner

PACKAGING ASSEMBLY WITH UNDERGRIPPER

CROSS-REFERENCE TO RELATED APPLICATIONS

This application claims foreign priority benefits under 35 U.S.C. § 119(a)-(d) to German patent application number DE 102018222397.1, filed Dec. 20, 2018, which is incorporated by reference in its entirety.

TECHNICAL FIELD

The present disclosure relates to a packaging assembly with an undergripper as well as to a method of operating the assembly.

BACKGROUND

Food products, e.g., slices of meat, fish or cheese, are often placed onto thin product supports, especially on thin separating paper, and then put into a further outer package, e.g., into a stable packaging tray, or onto a carton, or stacked, especially shingled, i.e., stacked in a partially overlapping mode. Making use of the separating paper, the shingled slices can then easily be removed individually by the consumer. In order to reduce the manual workload involved in packaging, a packaging assembly must be able to convey the thin product supports with the products located thereon and to place them into a stable outer package or onto a stable carrier. The challenge is to lift and move the thin product support. Air-flow processes, such as suctionally attracting the separating paper or lifting the separating, paper by means of an air stream, cannot be used for this purpose, since either particles of the product in question would be sucked in or the product would be contaminated with foreign particles.

SUMMARY

It is an object of the present disclosure to provide a packaging assembly, which allows improved handling of thin product supports.

A packaging assembly according to an embodiment of the present disclosure comprises a feed conveyor, a gripping area and an undergripper, wherein the feed conveyor has a conveying surface and is suitable for conveying on the conveying surface a product support into the gripping area. The undergripper is configured to grip the product support in the gripping area from below, i.e., to slide to a position below the product support, so as to be then able to lift the same. The packaging assembly has, in the gripping area, a support strip for the product support with an inner edge and an upper surface, the upper surface being raised in comparison with the conveying surface of the feed conveyor. While most of the product support rests on the conveying surface of the feed conveyor, an edge area of the product support rests on the inner edge of the support strip. The inner edge is here the contact edge of the substantially horizontal upper surface and of a perpendicular or inclined inner side. The support strip may here also be a flat metal sheet having a very small vertical thickness. Due to the fact that the upper surface of the support strip and thus the inner edge differ in height from the conveying surface of the feed conveyor, the edge area of the product support will be bent upwards. The product located on the product support provides here the weight force required for holding the product support in the central area thereof on the conveying surface. Together with the bending stiffness of the product support, the edge area of the latter is thus be bent upwards in the order of approx. 1 to 10 mm. Due to the fact that the product support projects upwards in its edge area, the undergripper can now reliably grip the product support from below, i.e., it can move inwards between the product support and the upper surface of the support strip and thus slide to a position below the product support. After having moved far enough, so that the product support having the products provided thereon rests on the undergripper to a sufficient extent, the undergripper will be able to lift the product support and to move it away. This ensures that the undergripper can reliably grip the product support from below, such gripping from below failing otherwise quite often, if the product support, in particular in the form of a thin separating paper, lies flat on a surface Preferably, the feed conveyor is a belt conveyor comprising in particular a belt. In this way, a stable conveying surface for the product support exists. The material chosen for the conveying surface of the belt conveyor may be slightly adherent, e.g., a rubber or silicone coating, so that the feed conveyor may also be operated at higher speeds. A belt conveyor having a continuously closed conveying surface also prevents the undergripper from moving into meshes or similar open structures.

According to an expedient variant, the support strip is arranged on the belt of the feed conveyor and is preferably fixedly or integrally connected to the feed conveyor. The support strip may consist e.g., of a flexible rubber material that has been glued, laminated or vulcanized onto the belt of the feed conveyor as a raised strip. Likewise, the support strip and the belt may be cast in one piece from rubber material. The support strip may be present on the belt continuously or section wise, and it is sufficiently flexible to follow the movement around the deflection pulleys of the feed conveyor. This arrangement has the advantage that there will be no gap between the support strip and the belt into which the product support might move unintentionally.

According to a common variant, the support strip is arranged as a support rail, which is separate from the feed conveyor and which partially overlaps the feed conveyor. The support rail may be formed e.g., from a metal and screwed onto the feed conveyor. In this way, the product support can lie completely flat on the feed conveyor upstream of the gripping area and upstream of the support rail and the desired width thereof can lie on the support rail or its inner edge in the gripping area.

Normally, the support strip is arranged on a lateral edge of the feed conveyor. The lateral edge area of the product support will thus be raised as described and the undergripper may also be arranged laterally of the feed conveyor and grip the product support from below in a movement that is perpendicular or oblique to a conveying direction. This prevents the product support from being moved or pushed against the undergripper and the conveying movement need not be interrupted.

Preferably, the support strip is arranged substantially parallel to a conveying direction. The gripping area can thus be determined depending on the length of the support strip and the speed of the feed conveyor. The raising of the lateral edge area of the product support can thus take place during a continuous conveying movement.

According to an advantageous variant, the support strip is arranged on the feed conveyor in an exchangeable manner. Thus, support strips of different sizes can be used, depending on the size of the product support. These support strips may have different lengths and, in particular, different widths, so that differently sized product supports will always overlap the support strip with a sufficiently broad edge area and the edge area will always be bent upwards by the inner edge of the support rail. In addition, there is no risk of the product support moving to a level below the support rail.

It will be expedient to arrange the support rail on the feed conveyor in a displaceable manner. This allows an adaptation to the size of the product support, alternatively to or additionally to an exchange of the support rail. In particular, an adaptation to the width of the product support can be carried out by a displacement perpendicular to the conveying direction.

According to a further variant, the support rail comprises a run-on slope. The run-on slope, which is arranged on a front end of the support rail when seen in the conveying direction, extends expediently up to a point below the level on which the product support is located while being conveyed upstream of the gripping area and in a flat state. In this way, the product support, when conveyed into the gripping area, can be pushed onto the run-on slope and further onto the support rail by the feed conveyor. For this propose, the run-on slope may be arranged laterally of the feed conveyor and the product support may be broader than the feed conveyor and project beyond the same on the sides. In addition, the run-on slope may widen from a narrow lower end to a broader upper end having, expediently, the width of the support rail.

According to a preferred variant, the packaging assembly comprises a second feed conveyor, which is configured to push the product support onto the run-on slope and/or the support rail. For this purpose, the second feed conveyor may have the same width as the first feed conveyor or a width that differs therefrom. In addition, the conveying surface of the second feed conveyor may be arranged on the same level as the conveying surface of the first feed conveyor or, alternatively, on a higher or a lower level than this conveying surface. The second feed conveyor is arranged upstream of the first feed conveyor. The use of a second feed conveyor ensures in a particularly reliable manner that the product support will not move to a level below the support rail, but will reliably be pushed onto the support rail even at fast feed rates. As can be seen in FIG. 1, the run-on slope may then be directed straight downwards on the upstream end of the first feed conveyor.

Typically, two lateral edges of the feed conveyor each have a support strip arranged thereon. In this way, the undergripper may be arranged both on the right and on the left hand side of the feed conveyor. Likewise, an undergripper may be used, which, by means of two gripping arms, grips the product support from below from both sides similar to a pincer movement. In addition, the fact that the product support symmetrically rests on the support strips on both sides prevents a displacement of the product support during the conveying movement.

According to a further advantageous variant, the undergripper has a beveled leading edge. This allows the gripping arm to be easily pushed to a position below the product support, in spite of an otherwise stable structural design of the undergripper and its gripping arm in the form of struts, fingers or surfaces, which are suitable for lifting the product support. The raising of the edge area of the product support can thus be reduced to a necessary minimum.

According to a typical variant, the undergripper is configured to be in flush contact with the upper surface of the support strip, at least in certain phases during the operation for gripping the product support from below. For this purpose, the undergripper may, for example, be pressed onto the upper side of the support strip with moderate pressure. This ensures that the undergripper will move inwards below the upwardly projecting edge area. The machine programming of the vertical travel of the undergripper may have certain tolerances, since also the contact pressure may vary within a certain range.

A method according to an embodiment of the present disclosure for operating a packaging assembly comprises the following method steps:

moving a product support in a conveying direction by means of a feed conveyor, placing and/or pushing the product support onto a support strip prior to and/or during the movement of the product support in the conveying direction, so that an edge area of the product support will rest on an inner edge of the support strip and project upwards beyond an upper surface of the support strip, the upper surface being raised in comparison with a conveying surface of the feed conveyor, gripping, from the side, the product support from below by means of an undergripper, and taking the product support away by means of the undergripper.

Preferably, pushing the product support onto the support strip comprises pushing onto a support rail arranged separately from the feed conveyor as well as onto a run-on slope arranged thereon.

According to an advantageous variant, the product support is moved by means of a second feed conveyor and is pushed, at least partially, by the latter onto the support rail and/or the run-on slope.

BRIEF DESCRIPTION OF THE DRAWINGS

In the following, embodiments of the present disclosure will be described in more detail making reference to the figures, in which.

Like components are provided with like reference numerals in the respective figures.

DETAILED DESCRIPTION

Figure 1:
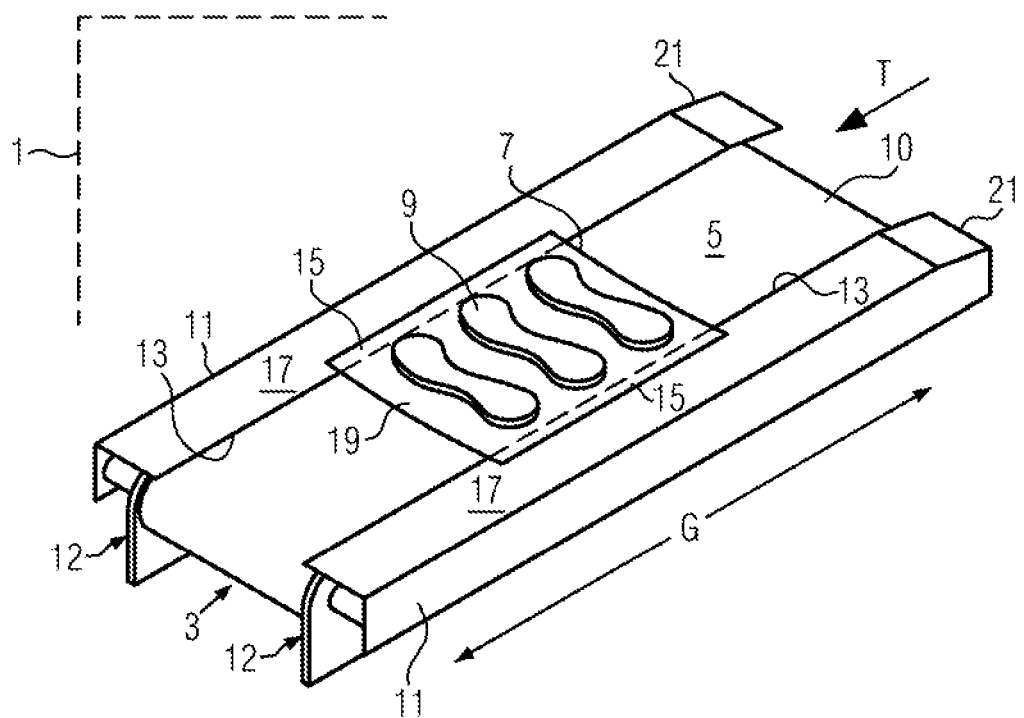
FIG. 1 shows a perspective view of a feed conveyor as part of a packaging assembly with support rails arranged on either side of the feed conveyor.

FIG. 1 shows a perspective view of a detail of a packaging assembly 1 with a feed conveyor 3, a product support 7 with slices of products 9 resting on the conveying surface 5 of this feed conveyor 3. The feed conveyor 3 is configured as a belt conveyor with a belt 10. A support strip 11 in the form of a support rail 11 formed separately from the feed conveyor 3 is arranged on either side of the feed conveyor 3 on a lateral edge 12 of the feed conveyor 3. The support rails 11 partially overlap the feed conveyor 3. The product support 7 rests on an inner edge 13 of the support rail 11. Since the inner edge 13 is raised in comparison with the conveying surface 5, a respective edge area 15 (identified by dashed lines) of the product support 7 is bent upwards and thus extends above an upper surface 17 of the support rail 11 in spaced relationship therewith. The product 9 on the product support 7 provides the necessary weight force to hold the product support 7 in a central area 19 thereof on the conveying surface 5 and to thus create the bend. Together with the bending stiffness of the product support 7, the edge area 15 can thus be bent up-wards in the order of approx. 1 to 10 mm.

The product support may e.g., be a separating sheet with a thickness of approx. 0.03 to 0.09 mm, which is made of paper, plastic or a composite material. In order to be able to push the product support 7 onto the support rail 11 in a conveying direction T, the latter has provided thereon a respective run-on slope 21. In the arrangement shown, the support rail 11 essentially defines the gripping area G, in which an undergripper (cf. FIG. 2) is able to grip the product support 7 from below and take it away.

Figure 2:
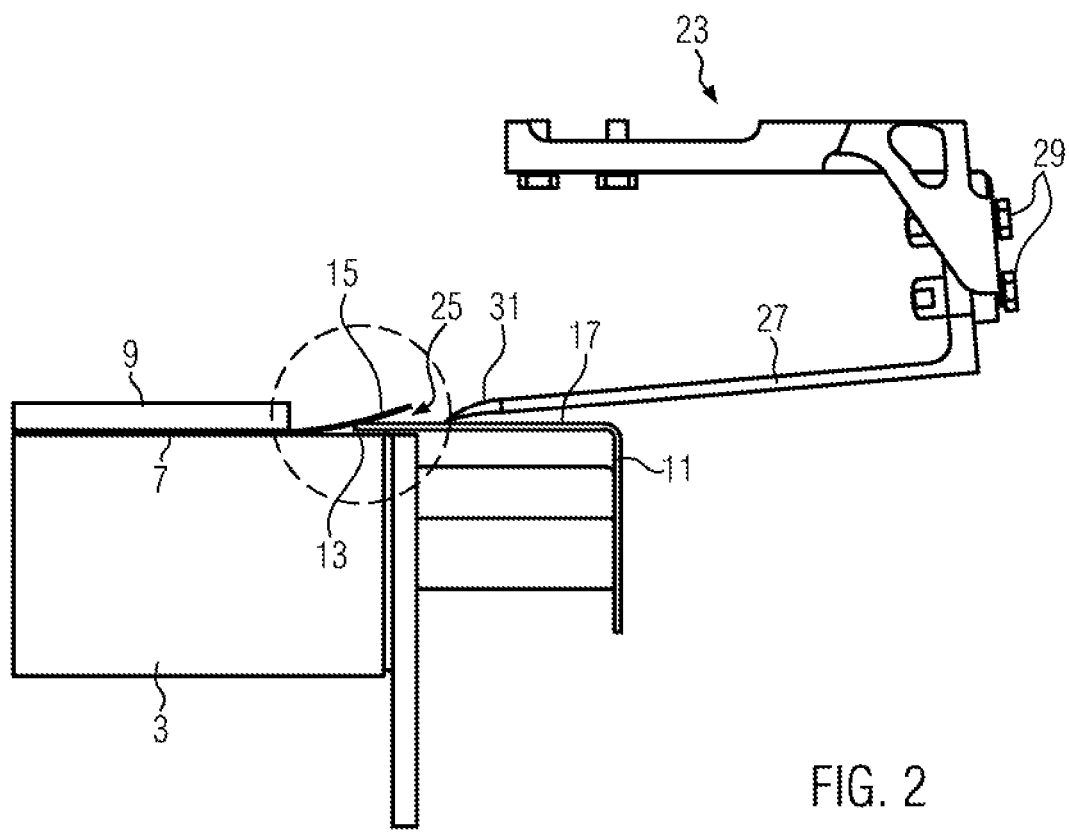
FIG. 2 shows a sectional view of a feed conveyor with support rail and undergripper.

FIG. 2 shows a sectional view of a lateral section of the feed conveyor 3 perpendicular to the conveying direction T with the support rail 11 and the undergripper 23. Due to the height of the inner edge 13, the edge area 15 of the product support 7 projects upwards beyond the upper surface 17 of the support rail 11, so that the undergripper 23 can enter the resultant gap 25 between the product support 7 and the upper surface 17 of the support rail 11. The undergripper 23 has a gripping arm 27, which may be provided in different sizes and designs and which, in addition, may be mounted in an exchangeable manner, e.g., by means of screw connections 29. The undergripper 23 and the gripping arm 27, respectively, may have a beveled leading edge 31, which improves entry into the gap 25 still further. In order to ensure reliable entry into the gap 25, the gripping arm 27 of the undergripper 23 can be pressed onto the upper surface 17 of the support rail 11 with moderate pressure. For this purpose, the gripping arm 27 or the undergripper 23 may also be spring-mounted in the travelling mechanism by means of which it is moved.

Figure 3:
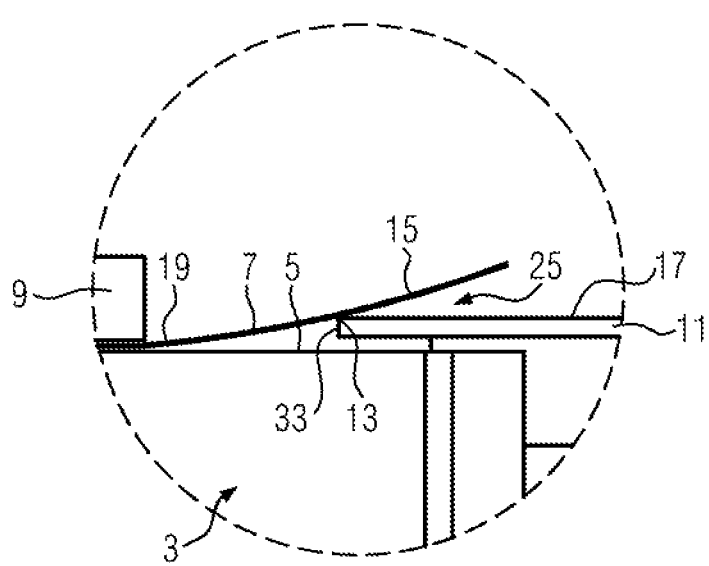
FIG. 3 shows an enlarged representation of the detail shown within a circle in FIG. 2.

FIG. 3 shows an enlarged representation of the area marked with a dotted circle in FIG. 2. It can be seen that, on the one hand, the central area 19 of the product support 7 is held on the conveying surface 5 of the feed conveyor 3 by the weight force of the product 9 and, on the other hand, the edge area 15 of the product support 7 rests on the inner edge 13 of the support rail 11 and is thus bent upwards. The support rail 11 also has an inner side 33, but, depending on the stability of the material used, it may also be configured as a flat metal sheet. The horizontal and the vertical position of the support rail 11 may be adjustable, so that the packaging assembly 1 can be used for product supports 7 of different sizes and also the size of the gap 25 can be changed. The support rail 11 may also be exchangeably arranged on the feed conveyor 3.

Figure 4:
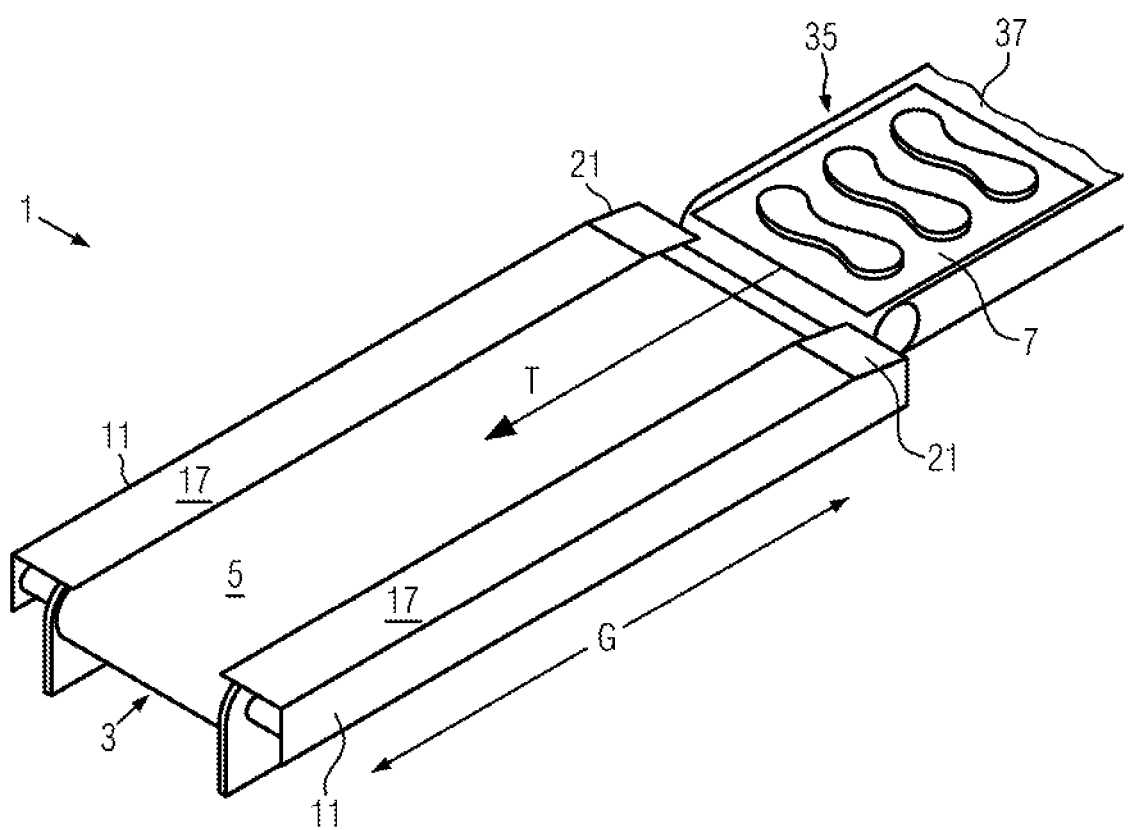
FIG. 4 shows a perspective view of a first and a second feed conveyor.

FIG. 4 shows a perspective view of a packaging assembly 1 comprising first and second feed conveyors 3, 35. In the embodiment shown, the second feed conveyor 35 has a width, so that the product support 7 rests completely on a conveying surface 37 of the second feed conveyor 35. The conveying surface 5 of the first feed conveyor 3 and the conveying surface 37 of the second feed conveyor 35 are located essentially on the same level and the run-on slopes 21 extend up to a point below this level, so that the second feed conveyor 35 will be able to push the product support 7 onto the run-on slopes 21 and further onto the upper surfaces 17 of the support rails 11. Further conveying in the gripping area G is carried out by the first feed conveyor 3. In addition to the embodiment shown, also many other variants are possible. For example, the second feed conveyor 35 may also be positioned on a higher level and deposit the product support 7 directly onto the upper surface 17 of the support rail 11, which means that the run-on slopes 21 can be dispensed with. In addition, the second feed conveyor 35 may be narrower and extend into the area between the run-on slopes 11.

Figure 5A:
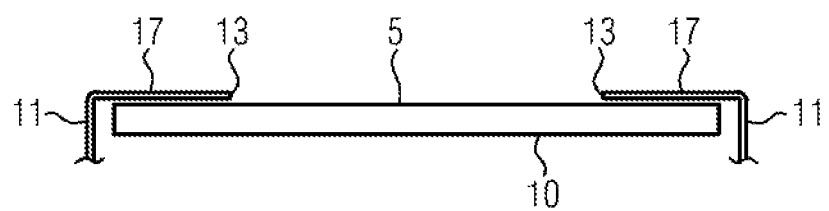
FIG. 5A shows a sectional view of a belt of a feed conveyor with support rails arranged separately from the belt.

FIG. 5A shows a sectional view of a belt 10 of a feed conveyor 3 with support rails 11 arranged separately from the belt, according to the embodiments of the preceding figures.

Figure 5B:
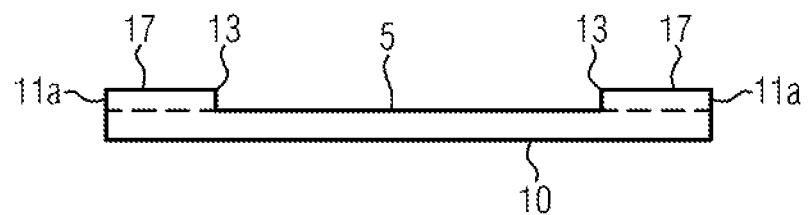
FIG. 5B shows a sectional view of a belt of a feed conveyor with support strips arranged on the belt.

FIG. 5B shows a sectional view of a belt 10 of a feed conveyor 3 with support strips 11a arranged on the belt 10, according to a further embodiment. The support strips 11a may be manufactured integrally with the belt 10 or they may be fixedly connected thereto. As in the above examples, the fact that the edge areas 15 of the product support 7 (not shown) rest on the inner edges 13 ensures that the edge areas 15 will project upwards beyond the upper surfaces 17 of the support strips. In the following, the mode of operation of the packaging assembly 1 will be described in more detail making reference to the figures.

Upstream of a gripping area G, a product support 7 is placed onto a first or second feed conveyor 3, 35 and loaded with a product 9, e.g., with one or a plurality of slices of a food product. The product support 7 is then moved in the conveying direction 1 to a gripping area G by means of the feed conveyor 3, 35. The feed conveyor 3, 35 then pushes the product support 7 onto the support strip 11, which is arranged in the gripping area G and configured in the form of a support rail 11. This pushing may be executed with the aid of run-on slopes 21. Alternatively, lateral support strips 11a (cf. FIG. 5B), onto which the product support 7 is placed or pushed, may already be part of the feed conveyor 3 or of the belt 10 of the latter. Due to the fact that the edge area 15 of the product support 7 rests on the support strip 11, 11a, the edge area 15 is bent upwards. Normally, when the edge area 15 of the product support 7 rests in full length on the support strip 11, 11a, the undergripper 23 will enter the gap 25 between the product support 7 and the upper surface 17 of the support strip 11, 11a from the side and continue its movement to a position below the product support 7 until the latter is positioned to a sufficient extent on the gripping arm 27 of the undergripper 23 for allowing the gripping arm to lift it. The product support 7 can then be taken away by means of the undergripper 23. The above described pushing of the product support 7 onto the support strip 11, 11a may either be accompanied by a transfer of the product support 7 from a second feed conveyor 35 to a first feed conveyor 3 or the movement of the product support 7 may be carried out completely by one feed conveyor 3.

Taking the above described embodiments of a packaging assembly 1 as a basis, many variations of the same are possible. The movements of the feed conveyors 3, 35 may take place in a continuous or in a clocked mode. As described above, two feed conveyors 3, 35 may be used, but it is also possible to use only one feed conveyor 3 and the run-on slopes 21 may extend partially laterally on this feed conveyor 3, so that projecting edge areas 15 will be pushed onto the run-on slopes 21. The run-on slopes 21 may be configured such that they taper downwards. The inner edge 13 of the support rail 11 may be rectangular or rounded off. The conveying surface 5 of the feed conveyor 3 may have elongate raised portions oriented perpendicular to the conveying direction T, whereby a leading edge of the product support 7 can project upwards and the product support 7 can thus be pushed onto the support rail 11 by means of a single feed conveyor 3, without any run-on slopes being required for this purpose.

What is claimed is:

1. A packaging assembly comprising:
a feed conveyor;
a gripping area; and
an undergripper,
the feed conveyor having a conveying surface and is suitable for conveying on the conveying surface a product support into the gripping area;
the undergripper is configured to grip the product support in the gripping area from below;
the packaging assembly has, in the gripping area, a support strip for the product support with an inner edge and an upper surface;
the upper surface being raised in comparison with the conveying surface of the feed conveyor;
the feed conveyor being a belt conveyor comprising a belt; and
the support strip being arranged on the belt of the feed conveyor and is fixedly or integrally connected to the feed conveyor.

2. The packaging assembly according to claim 1, wherein the support strip is arranged as a support rail, which is separate from the feed conveyor and which partially overlaps the feed conveyor.

3. The packaging assembly according to claim 1, wherein the support strip is arranged on a lateral edge of the feed conveyor.

4. The packaging assembly according to claim 1, wherein the support strip is arranged substantially parallel to a conveying direction.

5. The packaging assembly according to claim 1, wherein the support strip is arranged on the feed conveyor in an exchangeable manner.

6. The packaging assembly according to claim 2, wherein the support rail is arranged on the feed conveyor in a displaceable manner.

7. The packaging assembly according to claim 2, wherein the support rail comprises a run-on slope.

8. The packaging assembly according to one claim 7, further comprising a second feed conveyor configured to push the product support onto the run-on slope and/or the support rail.

9. The packaging assembly according to claim 1, wherein two lateral edges of the feed conveyor each have a support strip arranged thereon.

10. The packaging assembly according to claim 1, wherein the undergripper is configured to be in flush contact with the upper surface of the support strip, at least in certain phases during the operation for gripping the product support from below.

11. A method for operating a packaging assembly, comprising the following method steps:
moving a product support in a conveying direction by means of a feed conveyor,
placing and/or pushing the product support onto a support strip prior to and/or during the movement of the product support in the conveying direction, so that an edge area of the product support will rest on an inner edge of the support strip and project upwards beyond an upper surface of the support strip, the upper surface being raised in comparison with a conveying surface of the feed conveyor,
gripping, from the side, the product support from below by means of an undergripper, and
taking the product support away by means of the undergripper;
wherein pushing the product support onto the support strip comprises pushing onto a support rail arranged separately from the feed conveyor as well as onto a run-on slope arranged thereon.

12. The method according to claim 11, wherein the product support is moved by means of a second feed conveyor and is pushed, at least partially, by the latter onto the support rail and/or the run-on slope.

13. A method for operating a packaging assembly, comprising the following steps:
moving a product support in a conveying direction by a feed conveyor,
placing and/or pushing the product support onto a support strip prior to and/or during the movement of the product support in the conveying direction, so that an edge area of the product support will rest on an inner edge of the support strip and project upwards beyond an upper surface of the support strip, the upper surface being raised relative to a conveying surface of the feed conveyor,
gripping, from the side, the product support from below by an undergripper, and
taking the product support away by the undergripper;
wherein the feed conveyor is a belt conveyor comprising a belt; and
wherein the support strip is arranged on the belt of the feed conveyor and is fixedly or integrally connected to the feed conveyor.

14. The method according to claim 13, wherein pushing the product support onto the support strip comprises pushing onto a support rail arranged separately from the feed conveyor as well as onto a run-on slope arranged thereon.

15. The method according to claim 13, wherein the product support is moved by means of a second feed conveyor and is pushed, at least partially, by the latter onto a support rail and/or a run-on slope.

16. A packaging assembly comprising:
a feed conveyor;
a gripping area; and
an undergripper,
the feed conveyor having a conveying surface and is suitable for conveying on the conveying surface a product support into the gripping area;
the undergripper is configured to grip the product support in the gripping area from below;
the packaging assembly has, in the gripping area, a support strip for the product support with an inner edge and an upper surface;
the upper surface being raised in comparison with the conveying surface of the feed conveyor;
wherein the support strip is arranged on the feed conveyor in an exchangeable manner.

* * * * *